6 Sheets—Sheet 2.

S. D. LOCKE.
Machine for Picking Hops.

No. 223,854. Patented Jan. 27, 1880.

Attest:
H. D. Pennie.
Danl Kelly.

Inventor:
Sylvanus D. Locke
By Parkinson & Parkinson
Attorney's

N. PETERS, PHOTO-LITHOGRAPHER, WASHINGTON, D. C.

S. D. LOCKE.
Machine for Picking Hops.

No. 223,854. Patented Jan. 27, 1880.

6 Sheets—Sheet 4.
S. D. LOCKE.
Machine for Picking Hops.
No. 223,854. Patented Jan. 27, 1880.
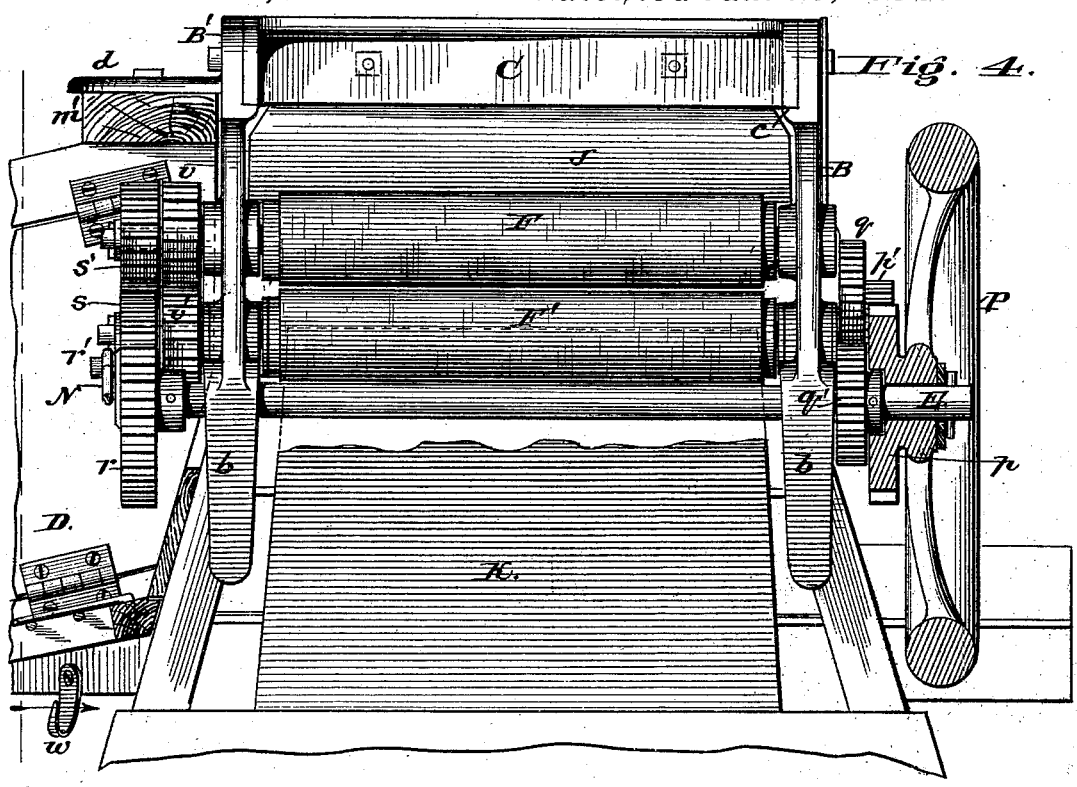
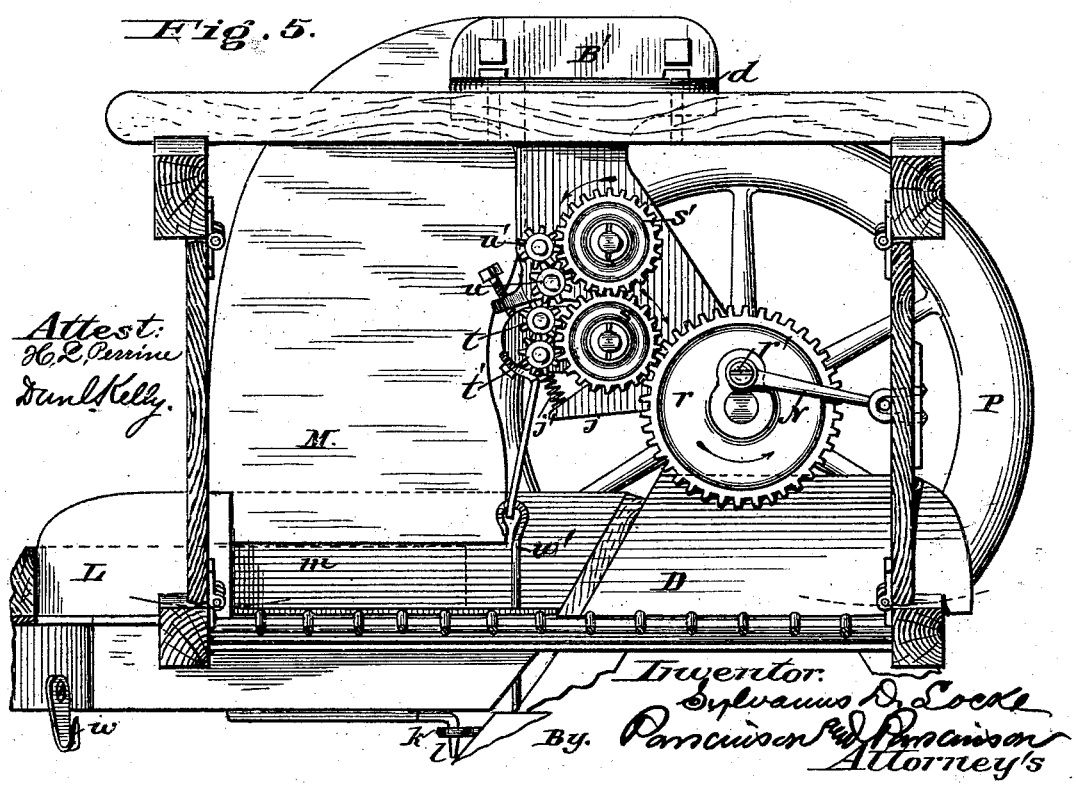

6 Sheets—Sheet 5.

S. D. LOCKE.
Machine for Picking Hops.

No. 223,854. Patented Jan. 27, 1880.

Attest:
H. L. Pinner,
Danl Kelly.

Inventor:
Sylvanus D. Locke
By Poncairson & Poncairson
Attorney's

6 Sheets—Sheet 6.
S. D. LOCKE.
Machine for Picking Hops.
No. 223,854. Patented Jan. 27, 1880.
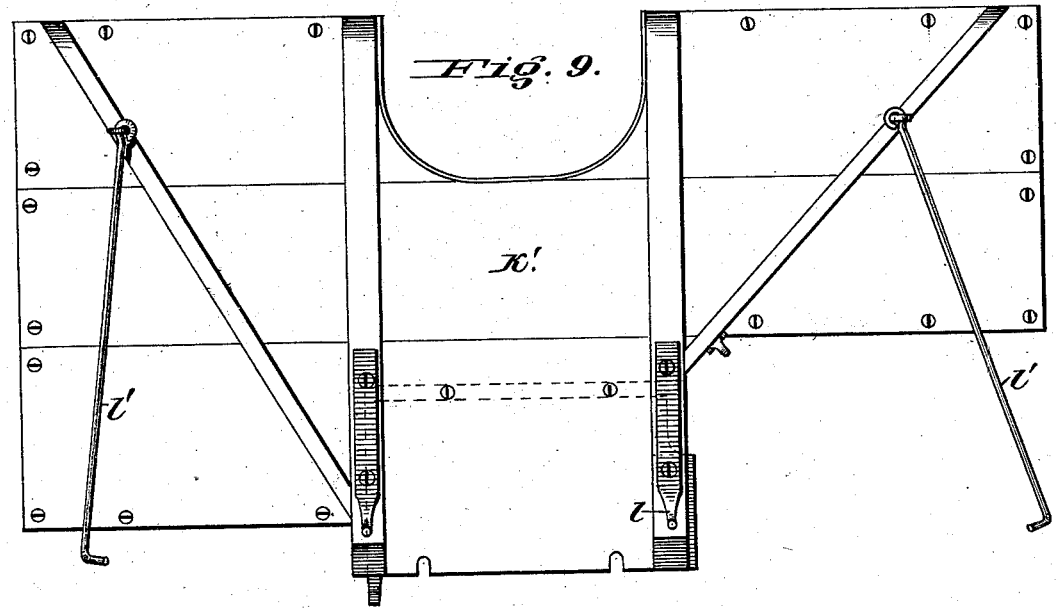
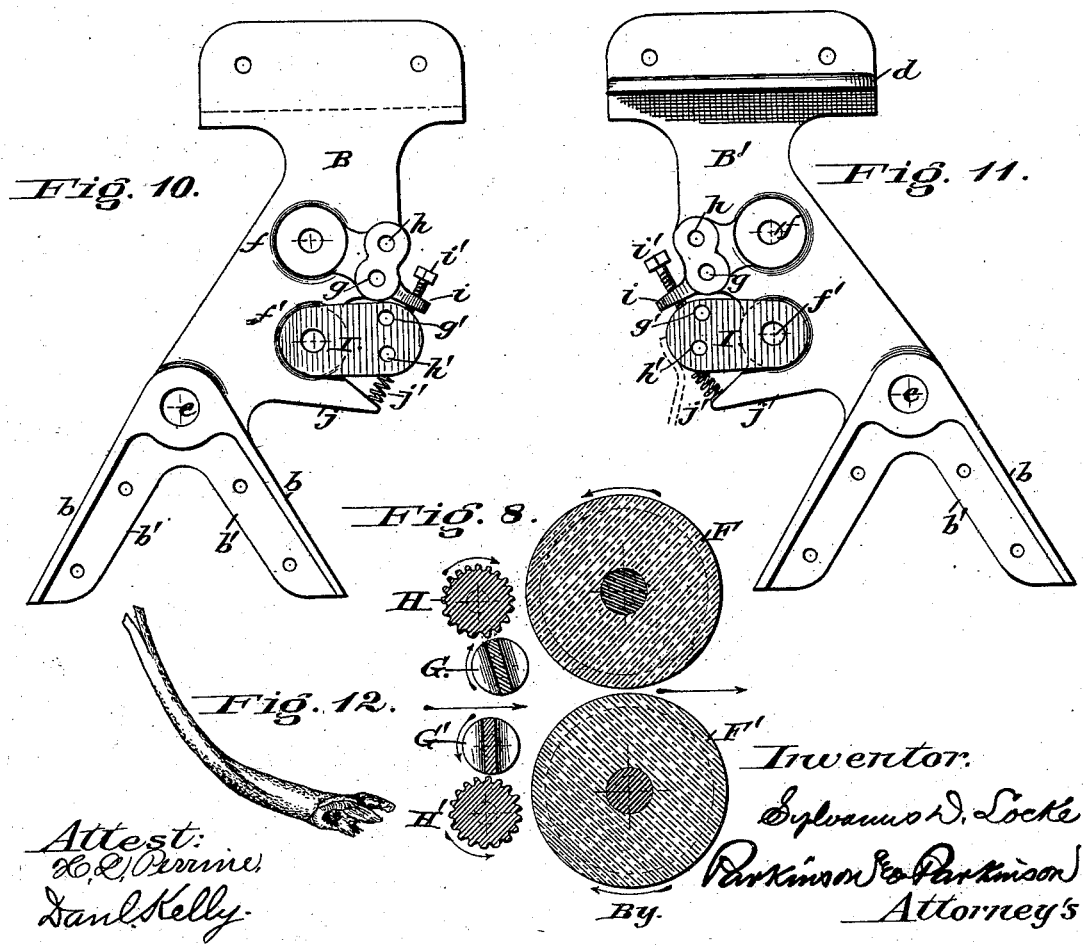
Attest:
H. Q. Perrine
Danl. Kelly
Inventor:
Sylvanus D. Locke
Parkinson & Parkinson
By. Attorneys

UNITED STATES PATENT OFFICE.

SYLVANUS D. LOCKE, OF HOOSICK FALLS, NEW YORK.

MACHINE FOR PICKING HOPS.

SPECIFICATION forming part of Letters Patent No. 223,854, dated January 27, 1880.

Application filed October 30, 1879.

*To all whom it may concern:*

Be it known that I, SYLVANUS D. LOCKE, of Hoosick Falls, in the county of Rensselaer and State of New York, have invented certain new and useful Improvements in Machines for Picking Hops, of which the following is a specification.

My invention relates to that class of machines in which the hop-vine, served by an attendant, is automatically drawn or pulled through stripping apparatus, by which the fruit or hop is swept from the stem and dropped into a receptacle or separator; and it consists in a sieve or separator at one side of said apparatus, fed from said table or a receptacle divided off therefrom; in a seat for the attendant in front of the vine-table and stripping apparatus; in mechanism controlled by the attendant, whereby the picker-rolls may be temporarily opened to permit the introduction of a fresh vine to the feed or drawing rolls; in a picker-roll journaled in bearings which are movable concentrically with the axis of its driving-gear; in clearing-rolls above and beneath the picker-rolls to prevent the passage of hops or débris, and in various combinations and details of construction hereinafter described and pointed out.

Figure 1:
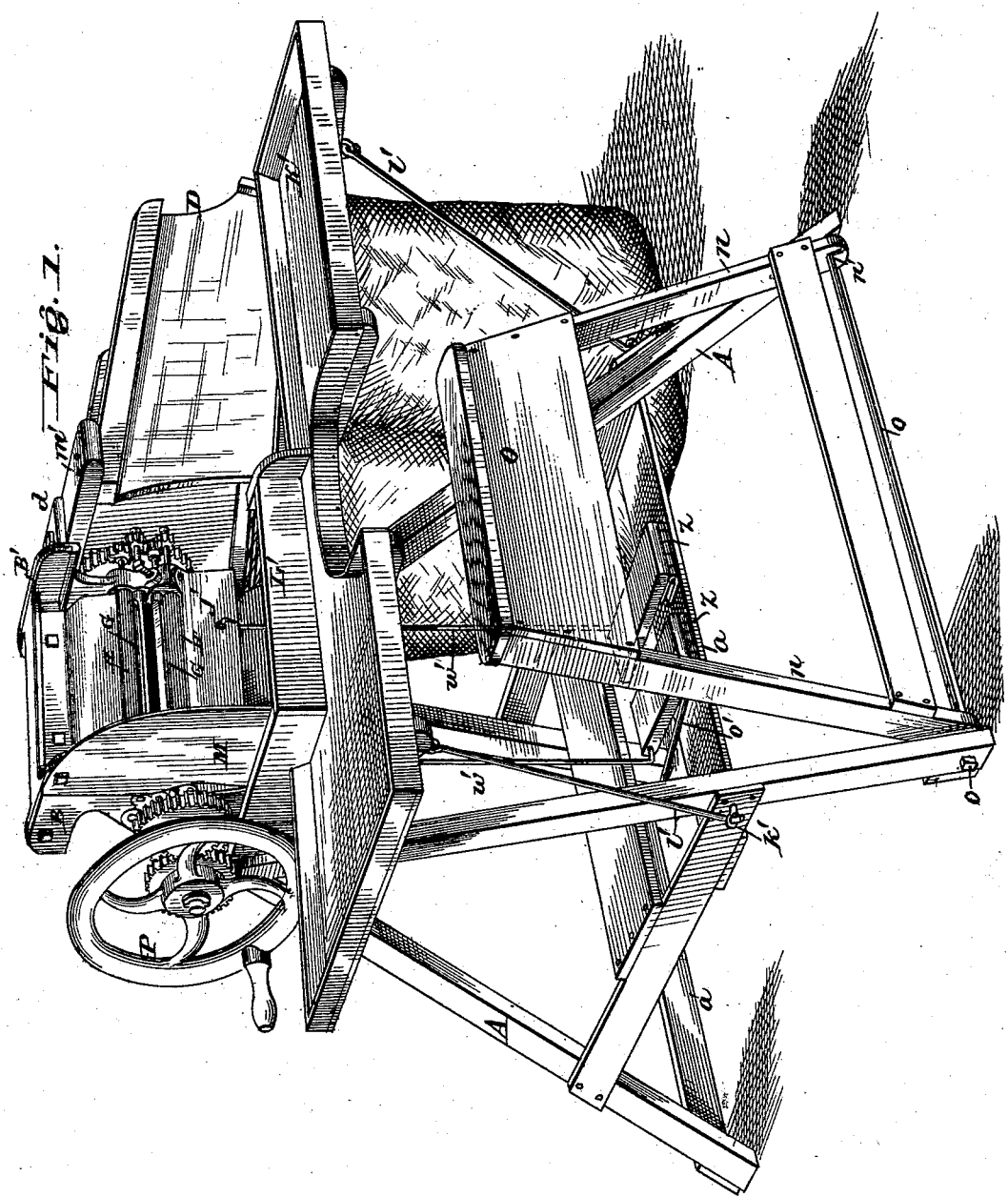
Figure 2:
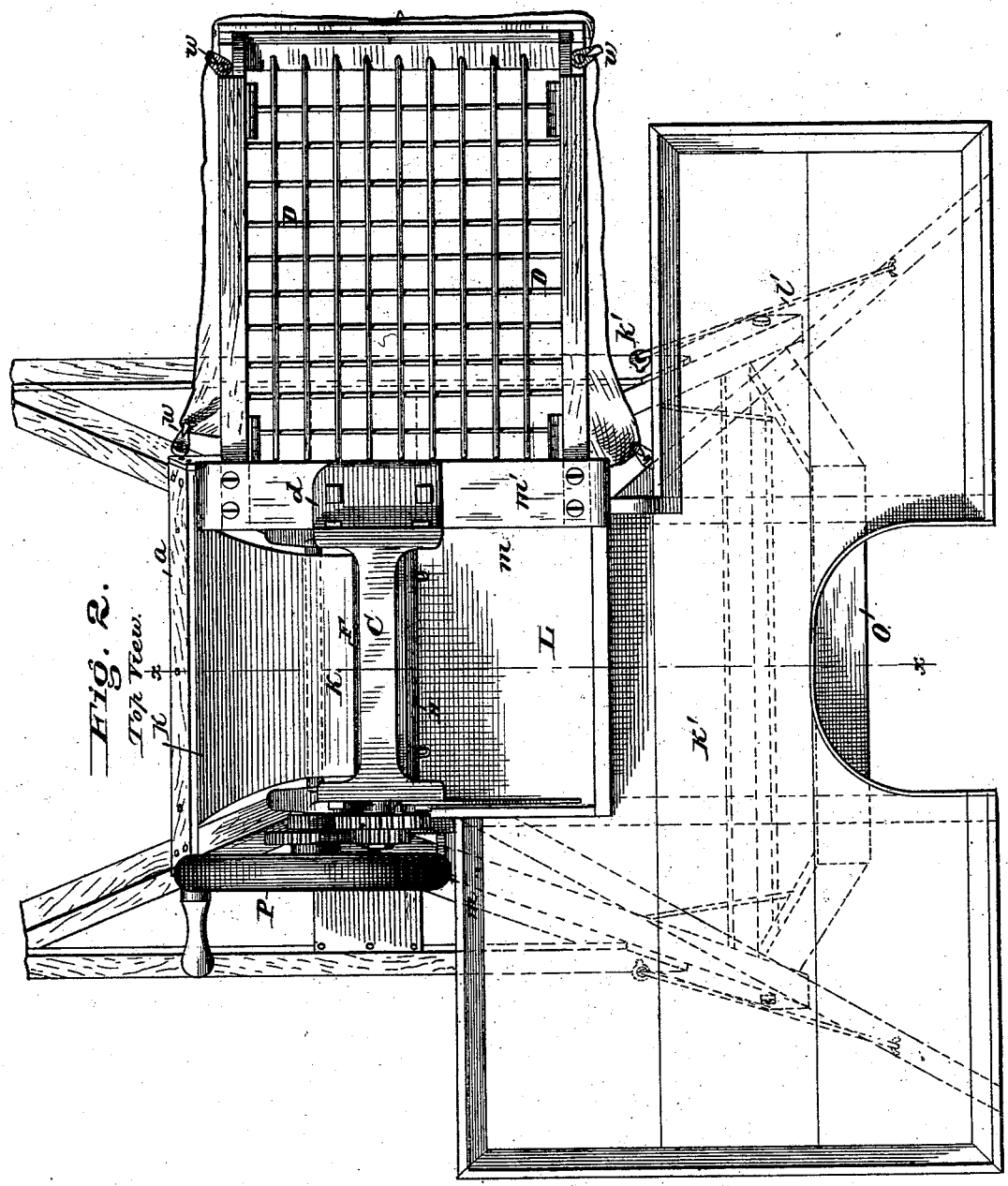
Figure 3:
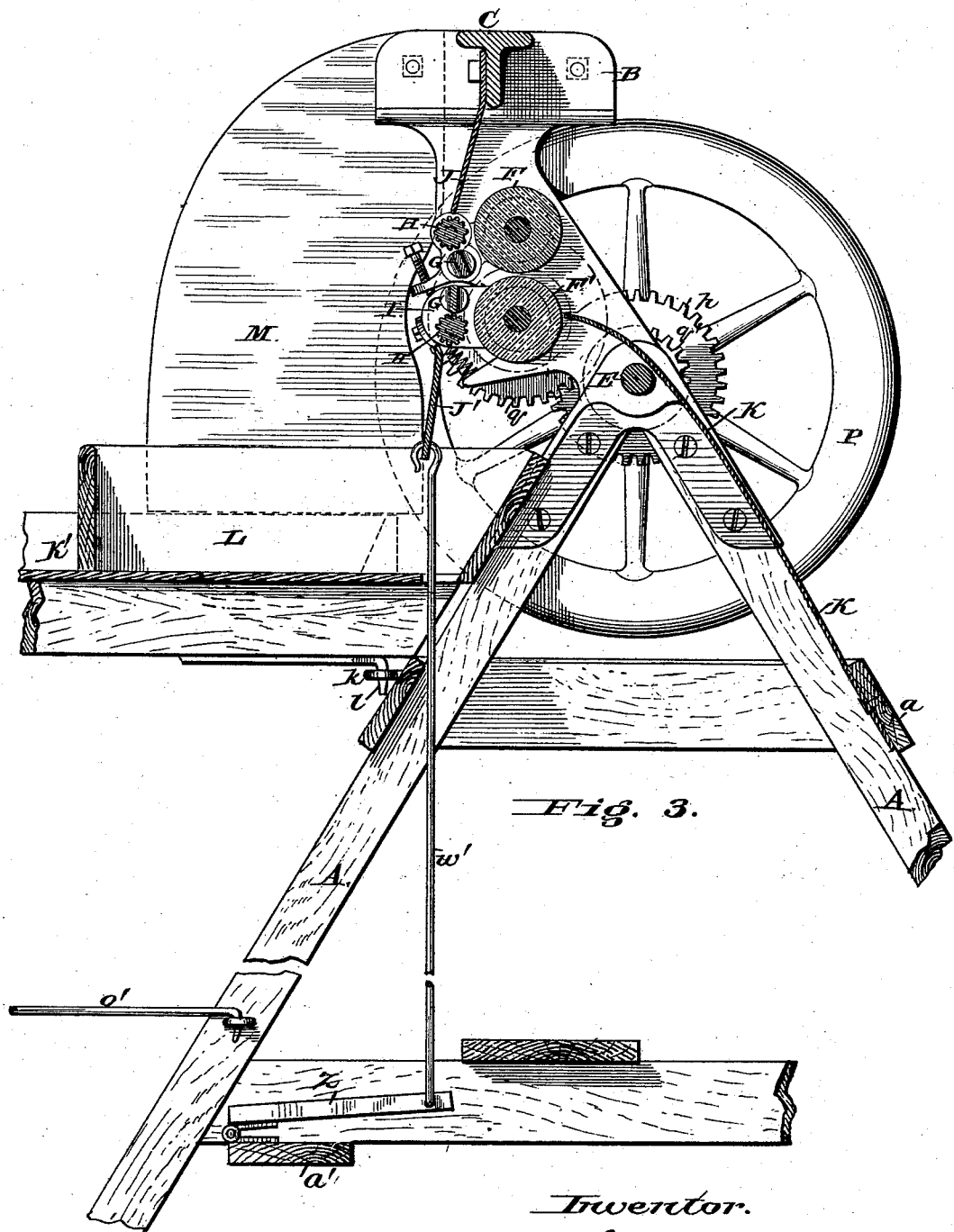
Figure 6:
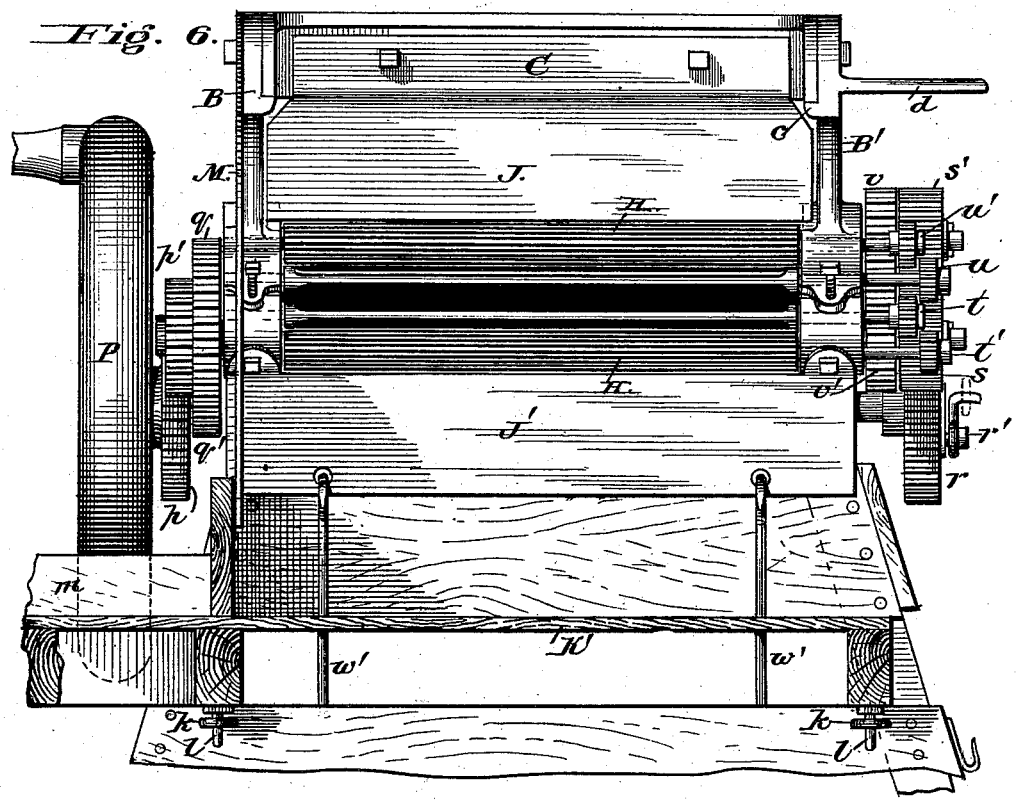
Figure 7:
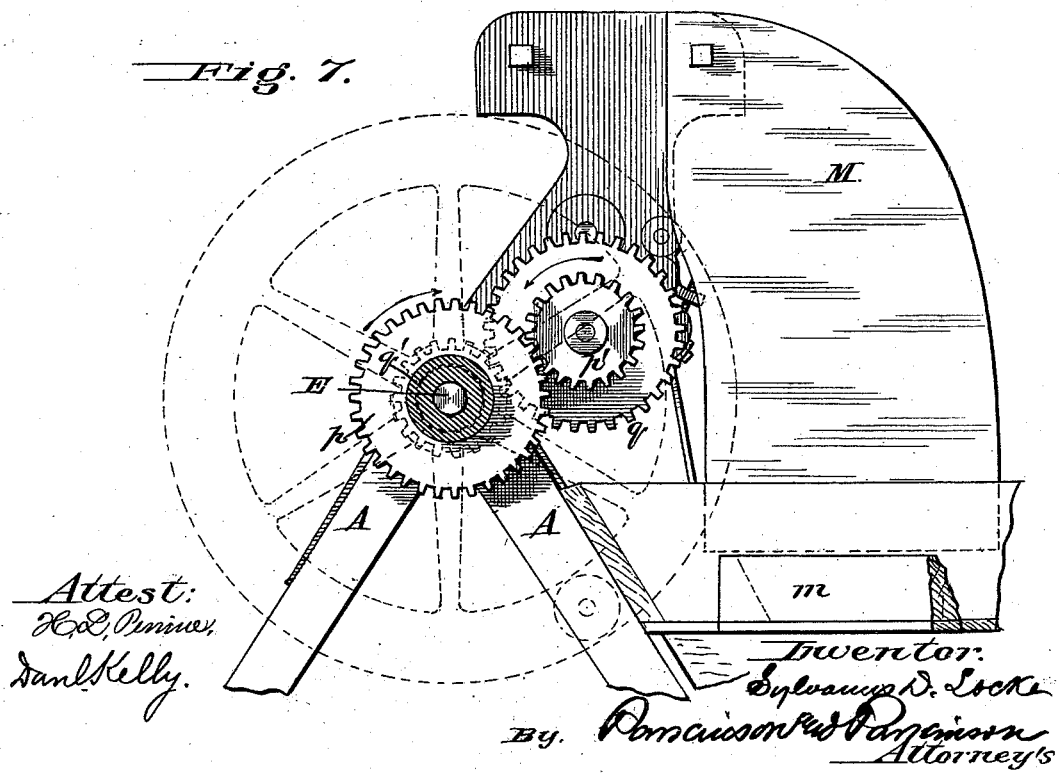

In the drawings, Figure 1 is a perspective view from the front of the machine. Fig. 2 is a plan view. Fig. 3 is a section on the line *x x* of Fig. 2. Fig. 4 is a rear view of the drawing-rolls and gearing at either end thereof, a portion being in section. Fig. 5 is an elevation of the gearing at the separator end of the stripping apparatus; Fig. 6, a front view thereof and of the stripping apparatus, showing the means for driving the picker and clearing rolls; Fig. 7, an elevation at the opposite or drive-wheel end; Fig. 8, a section through the drawing, picker, and clearing rolls, enlarged; Fig. 9, the vine-table detached and inverted. Figs. 10, 11, and 12 illustrate details.

The machine is mounted upon a frame, A A, which I have shown as consisting of four spreading legs united by ties and cross-pieces *a a'*, but which may be of any other suitable and convenient construction. Upon the apex of this frame are mounted castings or head-blocks B B', in which are journaled the various shafts and rolls of the stripping and clearing apparatus. These castings are formed with flaring feet *b*, which sit over and serve as straps to bind the joints of the respective pairs of legs, to which they are clamped by bolts or screws passing through holes in the flanges *b'*. They are united and braced at their tops by the cross-piece C, for which they have suitable seats *c*. The casting B' has also an overhanging ledge or shoulder, *d*, to which are bolted the supporting-arms of the separator D. In bearings *e* in and near the base of these castings turns the shaft E. Immediately above this shaft are the feed or drawing rolls F F', the gudgeons or journals of which rest, respectively, in the bearings *f f'* of the castings. The bearings *g* receive the journals of the upper picker-roll, G, and the bearings *h* those of the upper clearing-roll, H. In links or radius-bars I, pivoted upon or swinging about an axis concentric with the shaft of the drawing-roll F', are bearings *g' h'* for the lower picker-roll, G', and clearing-roll, H'.

A lug, *i*, projecting from each of the head-blocks, receives a set-screw, *i'*, against which the bearing-block at the end of the radius-bars impinges, and by which the minimum distance between the picker-rolls may be determined. Another lug, *j*, supports a spring, *j'*, upon which the bearing-block is cushioned, and by which the lower picker-roll is pressed toward the other and the block held normally against the set-screw.

A shield, J, pendent from the cross-bar C, protects the upper clearing-roll and prevents the passage of material above it. Another shield, J', attached to and extending below the bearing-blocks in the radius-bars, protects the lower clearing-roll and prevents the passage of material below it, while a third shield, K, projecting upward from the tie-piece *a* on the rear side of the machine, clears the lower drawing-roll and bars the return of vines and leaves drawn through.

The pulling or drawing rolls are made with a suitable biting-surface, preferably of rubber, and, when the machine is in action, are revolved in the direction indicated by the arrows in Fig. 8. The picker-rolls, as shown in same figure, are in advance of and revolve away from the drawing-rolls. They differ from the picker-rolls described and claimed in Letters Patent No. 203,351, granted to me May 7, 1878, in being flat or oblong in cross-section instead of fluted or ribbed, so as to present but two edges for the picking action, and therefore be more readily cleared and kept from gumming or choking. They are, in effect, beaters, one following slightly behind the other as they revolve, thus permitting the hops to partly enter the picking-space before they receive the alternating blows which remove them from the vine.

The clearing-rolls, placed respectively above the upper picker-roll and beneath the lower, and coming nearly or quite in contact with their edges as they revolve, turn each in the same direction with its companion picker-roll, the contiguous surfaces of the respective couples moving, therefore, in opposite directions. They may have any suitable surface to which stems, leaves, and hops will not catch or stick.

Eyes $k$ $k'$ upon the frame afford means for the attachment of a table, K', below and in front of the stripping devices to receive and support the hop-vines as they are brought by the laborers. Fixed hooks $l$ upon the table take into the eyes $k$, and long pivoted hooks $l'$ into the eyes $k'$, in such manner that it is firmly braced to bear its load, but can at any time be readily detached from the frame.

The table may be secured to the frame by other means allowing of its ready removal, or it may be made as a fixture thereon, which latter construction would, however, be less convenient. It is recessed directly opposite the stripping mechanism to bring the attendant within convenient reach thereof, while preserving the necessary superficial area for its purpose, and has a raised ledge around its periphery, that hops dropping from the vines while they are being handled or casually detached therefrom may be retained.

Immediately beneath the stripping mechanism I prefer to partition off from this table a receptacle, L, into which fall the hops as they are swept from the vine by the action of the rolls. This receptacle may be formed separately from the table and attached to the frame-work, but is advisably formed as a part of the table. Although it might be omitted, the whole table then forming the receptacle, it is obvious that such a course would have disadvantages, as the freshly-stripped hops, as they fell, would be constantly mingled with the vines upon the table.

A shield, M, depending from the head-block B, protects the gearing at that end of the stripping mechanism and guides flying hops into the receptacle, while a mouth or opening, $m$, through the side of the latter at the other end permits the free egress of its contents upon the sieve or screen of the separator D. This egress may be facilitated by giving the bottom of the receptacle a regular slope or decline from the head or shield end to its mouth.

The separator is or may be formed similar to the one shown and described in Letters Patent granted to me, as hereinbefore mentioned, but is arranged in different relation to the stripping apparatus, being placed at one end of the rolls and projecting longitudinally therewith instead of in advance of and transversely thereto. To support it in this position a ledge or shoulder, $d$, projects, as hereinbefore stated, from the head-block B', and to this ledge is firmly bolted the cross-piece $m'$, having at its ends suitable arms for the support of the riddle. Motion is imparted to the riddle by means of a pitman, N, running from the gear-wheel at the adjoining end of the shaft E.

Hooks $w$ at suitable points upon the separator-frame, main frame, and vine-table permit of the ready attachment and removal of bags for the reception of the cleaned hops.

The attendant may stand at the table while serving the vines to the stripping mechanism; but, in order that he may both have his hands free to manage the vines and his feet to control the machine, I provide a seat, O, mounted upon supports $n$, which are pivoted at $n'$ to a rod, $o$, passing through legs of the main frame. This seat is held in position for use by a pivoted hook, $o'$, catching into an eye upon the main frame, and when folded in for transportation of the machine, or to be out of the way of the attendant, may be secured by the same hook taking into another eye or over the edge of the cross-piece $a'$. That the weight of the attendant may not strain the frame-work or cause the pivotal rod to sag, the lower ends of the seat-supports should be made to extend just so far beyond the pivot that when the seat is open they rest upon the ground, and when it is folded in they are lifted up therefrom.

The machine is driven from the end farthest from the separator by means of a driving or crank wheel, P, mounted loosely upon the shaft E. A gear, $p$, fast to this wheel, meshes with and drives a pinion, $p'$, keyed to the shaft of the drawing-roll F'. A gear, $q$, attached to and turning with this pinion, meshes back with a pinion, $q'$, fast upon the shaft E. To steady the crank-wheel the last-named pinion has a hub, which fits snugly into a cylindrical recess or bearing in the gear $p$ upon the latter. At the opposite end of the shaft E is a gear, $r$, having a crank-pin, $r'$, for the pitman N, which moves the riddle, and meshing with a pinion, $s$, running loose upon the end of the shaft of the drawing-roll F'. The pinion $s$ in its turn meshes with another pinion, $s'$, running loose upon the end of the shaft of the drawing-roll F. The pinion $s$ drives the lower picker-roll, G', and clearing-roll H' by means of small pinions $t$ $t'$, fast upon their respective gudgeons, and the upper picker-roll, G, and clearing-roll H are in like manner driven from the pinion $s'$ through the instrumentality of pinions $u$ and $u'$. Fast upon the shafts of the drawing-rolls, between the pinions $s$ $s'$ and the head-block B', are intermeshing gears $v$ $v'$, by which the roll F is caused to rotate uniformly with but away from the roll F' as the latter is turned by the revolution of the pinion $p'$.

The train of gear at the drive-wheel end of the machine is well protected by the shield M. That at the other or separator end I have shown as uncovered; but it may be found advisable to also envelop it in a shield to guard it from leaves or sticks thrown up by a too vigorous action of the riddle or by a sudden gust of wind.

It will be understood that one of the pickers may be made as a fixed jaw, as explained in my former patent; but this arrangement I consider less beneficial than that herein described.

Hops are usually grown on poles, and the main vines are not run through the machine. The branches are pulled off, splitting from the parent stem at the node, so as to present an enlargement, as represented in Fig. 12.

The smaller vines and occasionally the branches are cut with a knife; but it is desirable, for facility in getting or preparing the vines for the picker, to avoid the use of the knife as much as possible. They are presented to the drawing-rolls large or butt end foremost. If grown on strings instead of poles all of the upper half usually may be run through without cutting.

As the picker-rolls are in advance of and revolve away from or in a contrary direction to the pulling or drawing rolls, their tendency is to reject or bar the introduction of a fresh vine, and when the butt of the latter presents an enlargement, by reason of splitting from the node, or is otherwise of equal or greater thickness than the space for the moment existing between the picker-rolls, it is practically impossible to get it within the bite of the drawing-rolls. To overcome this difficulty, I connect the radius-bars or the shield attached thereto by links $w'$ $w'$, depending from near each end of the latter, to treadles $z$ $z$ upon the cross-piece $a'$, whereby the operator can depress the radius-bars and rolls mounted therein at will without at any time removing his hands from the manipulation of the vines.

The motion of the rolls will be against their springs $j'$, which constantly tend to return them, and concentric with their driving-pinion $s$, about the axis of which their radius-bars swing, so that they are at no time thrown out of gear. They rise and fall at either end independently, so that when momentarily opened at any point by a bulge or node upon the vine passing through the remaining length of the picker-roll may be held to its work. This arrangement also permits the vines to be fed, lapping each other to the full capacity of the machine, one end of the lower picker-roll being depressed by the treadle immediately beneath for the introduction of a fresh vine, while the other end is left closed upon that at the time being drawn through. Of course this independent opening at the ends is not essential to good work. It only contributes to more and better work.

Five or six persons should be employed to serve the machine. Two are required to gather the vines and place them on the table in good shape for the attendant or feeder, who usually sits on the seat with a foot on each treadle. One or two more may be kept busy picking out leaves and removing any stems or short branches that get into the separator, and another turns the crank when the machine is run by hand-power.

I claim as my invention—

1. In a hop-picker, the combination, with the apparatus by which the hops are stripped from the vine, of a table for the support of the unstripped vines and stripped hops in front of and below the plane of said stripping apparatus.

2. In combination with the apparatus for stripping hops from the vine, a table for the support of the unstripped vines, in front of and below the plane of said apparatus, and a receptacle for the hops as they are picked, partitioned off from said table and located immediately beneath said apparatus.

3. In combination with apparatus for stripping hops from the vine, a receptacle immediately in front of and beneath said apparatus, and a riddle or separator to one side thereof, fed with hops from the receptacle.

4. In combination with the main frame, the seat for the operator, mounted upon supports which are pivoted at their lower or ground end and project beyond the pivot in such manner as to rest upon the ground when the seat is in position for use.

5. In combination with the picker-rolls, mechanism, controlled by the attendant, whereby one of said rolls, while retained in normal mesh with its driving-gear, may be moved away from the opposite roll or jaw.

6. In combination with the picker-rolls, mechanism, controlled by the attendant, whereby one of said rolls may be moved away at either end independently from the opposite roll or jaw.

7. The combination of a picker roll or jaw with an opposing picker-roll journaled in bearings which are movable concentrically with the axis of its driving-gear.

8. The combination, with picker-rolls, of clearing-rolls above and beneath them.

9. The combination, with the movable picker-roll, of a clearing-roll moving therewith and retained in fixed relation thereto.

10. The combination, with the movable picker-roll mounted in bearings in radius-bars which swing about the axis of its driving-gear, of a clearing-roll having bearings in the same radius-bars and driven by the same gear.

11. The combination, with the movable picker-roll and its spring-seats, of a treadle, whereby the attendant may open it away from the opposing picker roll or jaw while employing his hands in the manipulation of the vine.

12. The combination, with the movable picker-roll and its spring-seats, of two treadles, one connected with either end, whereby it may be independently opened away from the opposing roll or jaw at one end or the other.

13. The combination, with the movable picker roll or jaw, of the shield depending from its bearing-blocks and following its movements.

14. The combination, with the picker-rolls and their clearing-rolls, of the shields for stripping said clearing-rolls.

15. The combination, in a hop-picking machine, of drawing-rolls for the vine, picker-rolls to strip the hops therefrom, and clearing-rolls to sweep the picker-rolls.

16. The combination, in a hop-picking machine, of drawing-rolls for the vine, picker-rolls to strip the hops therefrom, clearing-rolls to sweep the picker-rolls, and shields to strip the clearing-rolls.

17. The head-block formed with bearings for the various shafts and rolls and with lugs, arranged as shown and set forth, for the springs and adjusting-screws, substantially as described.

18. The head-block formed as described, with bearings for the various shafts and rolls, lugs for the springs and adjusting-screws, and with a ledge or shoulder for the support of the separator.

19. The combination, with the pinions at the end of the picker and clearing roll shafts, of the intermeshing gears running loosely upon the ends of the drawing-roll shafts, substantially as described.

20. The picker-rolls formed flat or oblong in cross-section, so as to present but two edges to the picking action, and geared to revolve one slightly behind the other, substantially as described.

SYLVANUS D. LOCKE.

Witnesses:
WM. M. ARCHIBALD,
C. A. BROWN.